US009806935B2

(12) United States Patent
Michaelis et al.

(10) Patent No.: US 9,806,935 B2
(45) Date of Patent: Oct. 31, 2017

(54) METHODS AND SYSTEMS FOR SERVICE DISCOVERY MANAGEMENT IN PEER-TO-PEER NETWORKS (71) Applicant: QUALCOMM Incorporated, San Diego, CA (US)

(72) Inventors: Oliver Michaelis, San Diego, CA (US); J. Rodney Walton, Carkiske, MA (US); John W. Ketchum, Harvard, MA (US)

(73) Assignee: QUALCOMM Incorporated, San Diego, CA (US)

( * ) Notice: Subject to any disclaimer, the term of this patent is extended or adjusted under 35 U.S.C. 154(b) by 598 days.

(21) Appl. No.: 13/923,167

(22) Filed: Jun. 20, 2013

(65) Prior Publication Data
US 2013/0281086 A1 Oct. 24, 2013

Related U.S. Application Data (63) Continuation of application No. 12/547,672, filed on Aug. 26, 2009, now Pat. No. 8,478,820.

(51) Int. Cl.
*G06F 15/16* (2006.01)
*H04L 29/06* (2006.01)
*H04W 48/08* (2009.01)
*H04L 29/08* (2006.01)
*H04W 76/04* (2009.01)
(Continued)

(52) U.S. Cl.
CPC ........ *H04L 29/06326* (2013.01); *H04L 67/04* (2013.01); *H04L 67/16* (2013.01); *H04W 48/08* (2013.01); *H04W 76/04* (2013.01); *H04L 67/18* (2013.01); *H04W 4/00* (2013.01); *H04W 48/16* (2013.01); *H04W 92/18* (2013.01)

(58) Field of Classification Search
CPC .... H04L 29/06326; H04L 67/04; H04L 67/16
USPC .......................................... 709/204, 223–224
See application file for complete search history.

(56) References Cited

U.S. PATENT DOCUMENTS 6,604,140 B1 8/2003 Beck et al.
6,633,757 B1 10/2003 Hermann et al.
(Continued)

FOREIGN PATENT DOCUMENTS

CN 1627760 A 6/2005
CN 1717879 A 1/2006
(Continued)

OTHER PUBLICATIONS

Campo C et al: "PDP: A lightweight discovery protocol for local-scope interactions in wireless ad hoc networks", Computer Networks, Elsevier Science Publishers B.V., Amsterdam, NL, vol. 50, No. 17, Dec. 5, 2006 (Dec. 5, 2006, pp. 3264-3283, XP025182668, ISSN: 1389-1286, DOI: DOI:10.1016/J.Comnet.2005.12.007 [retrieved on Dec. 5, 2006].
(Continued)

*Primary Examiner* — Philip B Tran
(74) *Attorney, Agent, or Firm* — Holland & Hart LLP (57) ABSTRACT Certain embodiments of the present disclosure relate to a method and an apparatus for managing and optimizing service discovery in a peer-to-peer (P2P) wireless network. Nodes of the P2P network advertise their capabilities to their peers in the form of services. Efficient propagation and management of node's services to other nodes is proposed in the present disclosure.

31 Claims, 6 Drawing Sheets (51) Int. Cl.
 *H04W 4/00* (2009.01)
 *H04W 48/16* (2009.01)
 *H04W 92/18* (2009.01)

(56) References Cited

U.S. PATENT DOCUMENTS

| | | | |
|---|---|---|---|
| 6,909,721 B2 | 6/2005 | Ekberg et al. | |
| 7,293,080 B1 | 11/2007 | Clemm et al. | |
| 7,379,958 B2 | 5/2008 | Karhu | |
| 7,386,459 B2 | 6/2008 | English | |
| 7,440,994 B2 | 10/2008 | Harrow et al. | |
| 7,457,304 B2 | 11/2008 | Roh et al. | |
| 7,477,634 B1 | 1/2009 | McKown | |
| 7,492,777 B2 | 2/2009 | Ekberg et al. | |
| 7,496,075 B2 | 2/2009 | Kwak et al. | |
| 7,499,981 B2 | 3/2009 | Harrow et al. | |
| 7,516,201 B2 | 4/2009 | Kovacs et al. | |
| 7,546,363 B2 | 6/2009 | Harrow et al. | |
| 7,562,112 B2 | 7/2009 | Harrow et al. | |
| 7,590,097 B2 | 9/2009 | Ekberg et al. | |
| 7,631,033 B2 | 12/2009 | Zehler | |
| 7,647,012 B2 | 1/2010 | Yamada et al. | |
| 7,647,021 B2 | 1/2010 | Moore et al. | |
| 7,656,822 B1 | 2/2010 | Abdelaziz et al. | |
| 7,714,911 B2 | 5/2010 | Yoshida | |
| 7,734,717 B2 | 6/2010 | Saarimaki et al. | |
| 7,769,837 B2 | 8/2010 | Nogawa et al. | |
| 7,844,738 B2 | 11/2010 | Eytchison | |
| 7,904,561 B2 | 3/2011 | Chan et al. | |
| 7,921,155 B2 | 4/2011 | Harrow et al. | |
| 8,478,776 B2 | 7/2013 | Walton et al. | |
| 8,478,820 B2 | 7/2013 | Michaelis et al. | |
| 2003/0100307 A1* | 5/2003 | Wolochow | H04W 48/18 455/440 |
| 2003/0149917 A1 | 8/2003 | Smith et al. | |
| 2004/0162871 A1 | 8/2004 | Pabla et al. | |
| 2006/0178924 A1 | 8/2006 | Yagiura | |
| 2006/0235958 A1 | 10/2006 | Motoyama | |
| 2007/0060160 A1 | 3/2007 | Hur et al. | |
| 2007/0116031 A1 | 5/2007 | Chung et al. | |
| 2007/0141986 A1 | 6/2007 | Kuehnel et al. | |
| 2007/0141988 A1 | 6/2007 | Kuehnel et al. | |
| 2007/0153717 A1 | 7/2007 | Tervonen et al. | |
| 2007/0162971 A1* | 7/2007 | Blom | H04L 63/10 726/17 |
| 2007/0189322 A1 | 8/2007 | Hirose | |
| 2007/0192300 A1 | 8/2007 | Reuther et al. | |
| 2007/0195746 A1 | 8/2007 | Ryu et al. | |
| 2007/0283018 A1 | 12/2007 | Yun | |
| 2007/0287438 A1 | 12/2007 | Hansen et al. | |
| 2007/0298757 A1* | 12/2007 | Ahn | G08B 27/006 455/404.1 |
| 2008/0090656 A1 | 4/2008 | Hartwig | |
| 2008/0107089 A1 | 5/2008 | Larsson et al. | |
| 2008/0109852 A1* | 5/2008 | Kretz | G11B 27/002 725/62 |
| 2008/0123558 A1 | 5/2008 | Chhabra | |
| 2008/0132223 A1* | 6/2008 | Lin | G08G 1/0104 455/422.1 |
| 2008/0139116 A1 | 6/2008 | Balgard et al. | |
| 2008/0140835 A1 | 6/2008 | Bradley et al. | |
| 2008/0248802 A1 | 10/2008 | Krishnamoorthy | |
| 2008/0250160 A1 | 10/2008 | Hall | |
| 2008/0298329 A1 | 12/2008 | Mo et al. | |
| 2008/0313188 A1 | 12/2008 | Hu et al. | |
| 2009/0029691 A1 | 1/2009 | Shen et al. | |
| 2009/0029699 A1 | 1/2009 | Luukkala et al. | |
| 2009/0031035 A1 | 1/2009 | Dharmaraju et al. | |
| 2009/0036063 A1 | 2/2009 | Zuniga et al. | |
| 2009/0059890 A1 | 3/2009 | Cordeiro et al. | |
| 2009/0061784 A1 | 3/2009 | Cordeiro | |
| 2009/0092105 A1 | 4/2009 | Chou | |
| 2009/0103568 A1 | 4/2009 | Garba et al. | |
| 2009/0106810 A1 | 4/2009 | Stoye et al. | |
| 2009/0157829 A1 | 6/2009 | Choi et al. | |
| 2009/0213771 A1 | 8/2009 | Celentano et al. | |
| 2009/0219947 A1 | 9/2009 | Kariya | |
| 2009/0227282 A1 | 9/2009 | Miyabayashi et al. | |
| 2009/0237265 A1 | 9/2009 | Eguchi | |
| 2009/0274166 A1 | 11/2009 | Zhang et al. | |
| 2009/0290528 A1 | 11/2009 | Kwon et al. | |
| 2009/0323652 A1 | 12/2009 | Chen et al. | |
| 2010/0054223 A1 | 3/2010 | Zhang et al. | |
| 2010/0085916 A1 | 4/2010 | Yu et al. | |
| 2010/0097946 A1 | 4/2010 | Celentano et al. | |
| 2010/0105409 A1* | 4/2010 | Agarwal | G01S 5/0263 455/456.1 |
| 2010/0118785 A1 | 5/2010 | Sugaya | |
| 2010/0121977 A1* | 5/2010 | Kontola | H04L 1/0002 709/232 |
| 2010/0165925 A1 | 7/2010 | Del Prado Pavon et al. | |
| 2010/0226279 A1* | 9/2010 | Georgis | H04W 64/00 455/456.1 |
| 2010/0250673 A1* | 9/2010 | Laroia | H04W 4/02 709/204 |
| 2010/0260042 A1 | 10/2010 | Kwon et al. | |
| 2011/0040603 A1* | 2/2011 | Wolfe | G06Q 30/02 705/7.31 |
| 2011/0044280 A1 | 2/2011 | Zhai | |
| 2011/0069187 A1 | 3/2011 | Yokota | |
| 2011/0113085 A1 | 5/2011 | Manor et al. | |
| 2011/0205962 A1 | 8/2011 | Das et al. | |
| 2012/0033585 A1 | 2/2012 | Michaelis et al. | |
| 2012/0295641 A1* | 11/2012 | Tsuda | H04B 7/18547 455/456.6 |
| 2013/0281146 A1 | 10/2013 | Walton | |

FOREIGN PATENT DOCUMENTS

| | | |
|---|---|---|
| CN | 1723643 A | 1/2006 |
| CN | 100334652 C | 8/2007 |
| CN | 101341685 A | 1/2009 |
| EP | 1542409 A1 | 6/2005 |
| EP | 1677462 A1 | 7/2006 |
| EP | 1592177 B1 | 4/2007 |
| JP | 2003092575 A | 3/2003 |
| JP | 2003284139 A | 10/2003 |
| JP | 2005086570 A | 3/2005 |
| JP | 2005167696 A | 6/2005 |
| JP | 2005234877 A | 9/2005 |
| JP | 2005318581 A | 11/2005 |
| JP | 2005537762 A | 12/2005 |
| JP | 2006013811 A | 1/2006 |
| JP | 2006171917 A | 6/2006 |
| JP | 2006237658 | 9/2006 |
| JP | 2006287463 A | 10/2006 |
| JP | 2007180839 A | 7/2007 |
| JP | 2007234008 A | 9/2007 |
| JP | 2009055246 A | 3/2009 |
| JP | 2009055350 A | 3/2009 |
| JP | 2009105750 A | 5/2009 |
| JP | 2009521190 A | 5/2009 |
| JP | 2009232259 A | 10/2009 |
| JP | 2009537898 A | 10/2009 |
| JP | 2010534980 A | 11/2010 |
| JP | 2010537699 A | 12/2010 |
| JP | 2011512102 A | 4/2011 |
| JP | 2011521583 A | 7/2011 |
| KR | 20040083238 A | 10/2004 |
| KR | 20050108087 A | 11/2005 |
| KR | 20090063732 A | 6/2009 |
| TW | 527791 B | 4/2003 |
| TW | 200801969 A | 1/2008 |
| WO | 2007075961 A2 | 7/2007 |
| WO | 2007136622 A2 | 11/2007 |
| WO | 2008066777 A2 | 6/2008 |
| WO | 2009015322 A2 | 1/2009 |

OTHER PUBLICATIONS

Chakraborty D et al: "Toward Distributed Service Discovery in Pervasive Computing Environments", IEEE Transactions on (56) References Cited

OTHER PUBLICATIONS

Mobile Computing, IEEE Service Center, Los Alamitos, CA, US LNKD—DOI:10.1109/TMC.2006.26, vol. 5, No. 2, Feb. 1, 2006 (Feb. 1, 2006), pp. 97-112, XP001545958, ISSN: 1536-1233.
Clausen T, et al., "Optimized Link State Routing Protocol", IETF draft, Oct. 2003.
European Search Report—EP12185358—Search Authority—Munich—Nov. 23, 2012.
Fan et al: "Bandwidth allocation in UWB WPANs with ECMA-368 MAC", Computer Communications, Elsevier Science Publishers BV, Amsterdam, NL, vol. 32, No. 5, Mar. 27, 2009 (Mar. 27, 2009), pp. 954-960, XP026001994, ISSN: 0140-3664, DOI: DOI:10.1016/J.Comcom.2008.12.024 [retrieved on Dec. 30, 2008] abstract section 2. Proposed MAS allocation method.
Gunther Auer, "Contention Free Dynamic Slot Allocation in Cellular Networks," Sarnoff Symposium 2009.
Guttman C Perkins J Kempf Sun Microsystems E: "Service Templates and Service: Schemes; rfc2609.txt", IETF Standard, Internet Engineering Task Force, IETF, CH, Jun. 1, 1999 (Jun. 1, 1999), XP015008392, ISSN: 0000-0003.
International Search Report and Written Opinion—PCT/US2010/045226—ISA/EPO—Jun. 8, 2011.
Standard ECMA-368, "High Rate Ultra Wideband PHY and MAC Standard", 2nd Edition, ECMA International, Geneva, Switzerland, Dec. 2007, pp. 1-330, XP002563778.
Sud S, et al., "Enabling rapid wireless system composition through layer-discovery", IEEE Network, IEEE Service Center, New York, NY, US, vol. 22, No. 4, Jul. 1, 2008 (Jul. 1, 2008), pp. 14-20, XP011232023,ISSN, 0890-8044, DOI, DOI,10.1109/MNET.2008.4579766 abstract p. 16, left-hand column, paragraph 1—right-hand column, paragraph 1 p. 18, right-hand column, paragraph 3-6.
Taiwan Search Report—TW099113744—TIPO—Mar. 1, 2013.
Ververidis C N, et al., "Service discovery for mobile Ad Hoc networks, a survey of issues and techniques", IEEE Communications Surveys, IEEE, New York, NY, US, vol. 10, No. 3, Jul. 1, 2008 (Jul. 1, 2008), pp. 30-45, XP011234560, ISSN, 1553-877X, DOI, DOI,10.1109/COMST.2008.4625803 p. 34, left-hand column, paragraph 4—p. 36, left-hand column, paragraph 2.
Wei Kuang Lai, "MARS: a multiple access scheme with sender driven and reception first for smart antenna in ad hoc networks", Wireless Communications and Mobile Computing, Wirel. Commun. Mob. Comput. 2009; 9: 197-208. Published online Apr. 21, 2008 in Wiley InterScience. 0.
Zhensheng Zhang, "Pure Directional Transmission and Reception Algorithms in Wireless Ad Hoc Networks with Directional Antennas," 2005 IEEE International Conference on Communications, May 16-20, 2005, Seoul, Korea.
European Search Report—EP16154430—Search Authority—Munich—Apr. 20, 2016.

* cited by examiner

METHODS AND SYSTEMS FOR SERVICE DISCOVERY MANAGEMENT IN PEER-TO-PEER NETWORKS

PRIORITY CLAIM

The present Application for Patent is a Continuation of patent application Ser. No. 12/547,672 entitled METHODS AND SYSTEMS FOR SERVICE DISCOVERY MANAGEMENT IN PEER-TO-PEER NETWORKS filed Aug. 26, 2009, issuing as U.S. Pat. No. 8,478,820, and assigned to the assignee hereof and hereby expressly incorporated by reference herein.

TECHNICAL FIELD

The technology discussed below generally relates to wireless communications and, more particularly to managing service discovery in peer-to-peer networks.

BACKGROUND

Nodes of a peer-to-peer (P2P) wireless network typically advertise capabilities to their peers in the form of services. Such services can, for example, provide connectivity between nodes and/or access to other nodes' content. Thus, an important element in designing a P2P network is efficient propagation of a node's services to other nodes that may be interested in those services.

Significant gain in usability of a P2P network may be achieved if a node can advertise its services, not only to direct neighbors of the node (one hop away), but also to nodes that are more than one hop away. Unfortunately, in the case of conventional multi-hop architectures, management of service advertisements and consumed bandwidth for discovery purposes may be prohibitive.

SUMMARY

Certain embodiments of the present disclosure provide a method for wireless communications by a wireless node in a peer-to-peer (P2P) network. The method generally includes receiving one or more advertisements of services offered by one or more other wireless nodes in the P2P network, generating a prioritized list of services, based on one or more services offered by the wireless node and services listed in the received advertisements of services, and distributing the prioritized list of services to other wireless nodes in the P2P network.

Certain embodiments of the present disclosure provide a method for wireless communications by a wireless node of a peer-to-peer (P2P) network. The method generally includes receiving an advertisement including a list of one or more services offered by wireless nodes of the P2P network, identifying a service of interest from the list, and identifying at least one of the wireless nodes in the P2P network that offers the service of interest.

Certain embodiments of the present disclosure provide an apparatus for wireless communications by a wireless node in a peer-to-peer (P2P) network. The apparatus generally includes logic for receiving one or more advertisements of services offered by one or more other wireless nodes in the P2P network, logic for generating a prioritized list of services, based on one or more services offered by the wireless node and services listed in the received advertisements of services, and logic for distributing the prioritized list of services to other wireless nodes in the P2P network.

Certain embodiments of the present disclosure provide an apparatus for wireless communications by a wireless node in a peer-to-peer (P2P) network. The apparatus generally includes logic for receiving an advertisement including a list of one or more services offered by wireless nodes of the P2P network, logic for identifying a service of interest from the list, and logic for identifying at least one of the wireless nodes in the P2P network that offers the service of interest.

Certain embodiments of the present disclosure provide an apparatus for wireless communications by a wireless node in a peer-to-peer (P2P) network. The apparatus generally includes means for receiving one or more advertisements of services offered by one or more other wireless nodes in the P2P network, means for generating a prioritized list of services, based on one or more services offered by the wireless node and services listed in the received advertisements of services, and means for distributing the prioritized list of services to other wireless nodes in the P2P network.

Certain embodiments of the present disclosure provide an apparatus for wireless communications by a wireless node in a peer-to-peer (P2P) network. The apparatus generally includes means for receiving an advertisement including a list of one or more services offered by wireless nodes of the P2P network, means for identifying a service of interest from the list, and means for identifying at least one of the wireless nodes in the P2P network that offers the service of interest.

Certain embodiments of the present disclosure provide a computer-program product for wireless communications by a wireless node in a peer-to-peer (P2P) network, comprising a computer-readable medium having instructions stored thereon, the instructions being executable by one or more processors. The instructions generally include instructions for receiving one or more advertisements of services offered by one or more other wireless nodes in the P2P network, instructions for generating a prioritized list of services, based on one or more services offered by the wireless node and services listed in the received advertisements of services, and instructions for distributing the prioritized list of services to other wireless nodes in the P2P network.

Certain embodiments of the present disclosure provide a computer-program product for wireless communications by a wireless node in a peer-to-peer (P2P) network, comprising a computer-readable medium having instructions stored thereon, the instructions being executable by one or more processors. The instructions generally include instructions for receiving an advertisement including a list of one or more services offered by wireless nodes of the P2P network, instructions for identifying a service of interest from the list, and instructions for identifying at least one of the wireless nodes in the P2P network that offers the service of interest.

BRIEF DESCRIPTION OF THE DRAWINGS

So that the manner in which the above-recited features of the present disclosure can be understood in detail, a more particular description, briefly summarized above, may be had by reference to embodiments, some of which are illustrated in the appended drawings. It is to be noted, however, that the appended drawings illustrate only certain typical embodiments of this disclosure and are therefore not to be considered limiting of its scope, for the description may admit to other equally effective embodiments.

DETAILED DESCRIPTION

The word "exemplary" is used herein to mean "serving as an example, instance, or illustration." Any embodiment described herein as "exemplary" is not necessarily to be construed as preferred or advantageous over other embodiments.

Exemplary Wireless Communication System

The techniques described herein may be used for various broadband wireless communication systems, including communication systems that are based on an orthogonal multiplexing scheme. Examples of such communication systems include Orthogonal Frequency Division Multiple Access (OFDMA) systems, Single-Carrier Frequency Division Multiple Access (SC-FDMA) systems, and so forth. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

One specific example of a communication system based on an orthogonal multiplexing scheme is a WiMAX system. WiMAX, which stands for the Worldwide Interoperability for Microwave Access, is a standards-based broadband wireless technology that provides high-throughput broadband connections over long distances. There are two main applications of WiMAX today: fixed WiMAX and mobile WiMAX. Fixed WiMAX applications are point-to-multipoint, enabling broadband access to homes and businesses, for example. Mobile WiMAX offers the full mobility of cellular networks at broadband speeds.

IEEE 802.16x is an emerging standard organization to define an air interface for fixed and mobile broadband wireless access (BWA) systems. These standards define at least four different physical layers (PHYs) and one medium access control (MAC) layer. The OFDM and OFDMA physical layer of the four physical layers are the most popular in the fixed and mobile BWA areas respectively. It should be understood that many other standard and non-standard wireless networks exist, all of which are meant to be included within the capabilities of this application.

Figure 1:
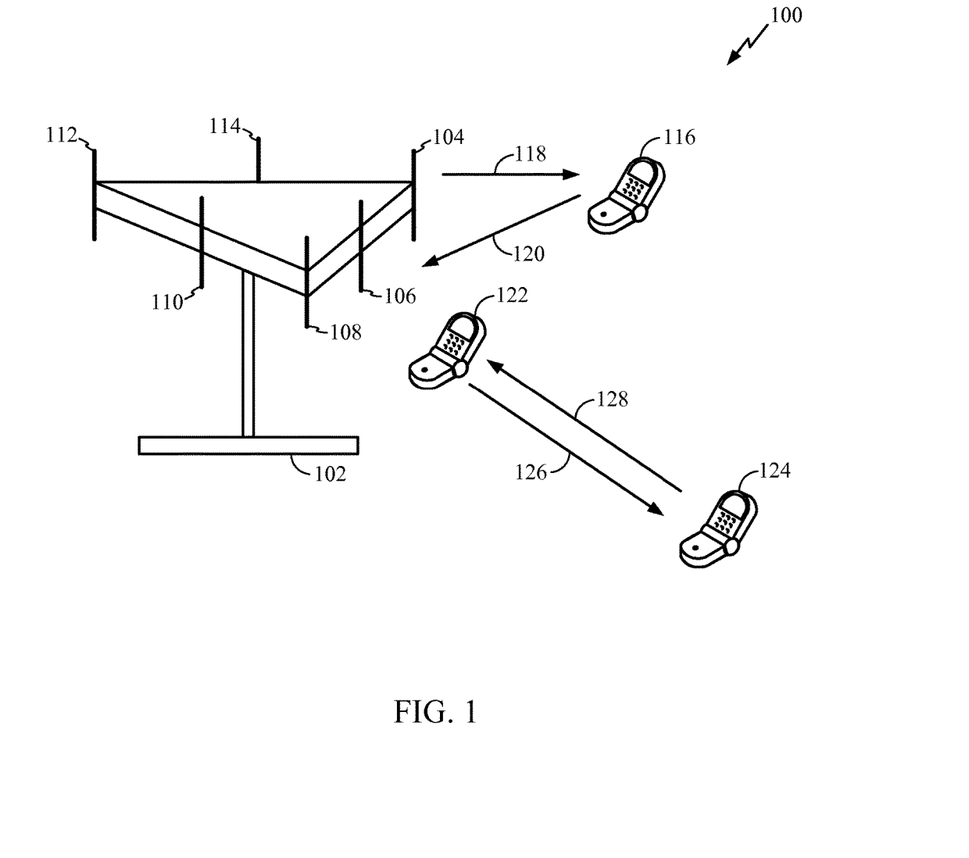
FIG. 1 illustrates an example wireless communication system in accordance with certain embodiments of the present disclosure.

Referring now to FIG. 1, illustrated is a wireless communication system 100 in accordance with various embodiments of the present disclosure. System 100 comprises a base station 102 that can include multiple antenna groups. For example, one antenna group can include antennas 104 and 106, another group can comprise antennas 108 and 110, and an additional group can include antennas 112 and 114. Two antennas are illustrated for each antenna group; however, more or fewer antennas can be utilized for each group. Base station 102 can additionally include a transmitter chain and a receiver chain, each of which can in turn comprise a plurality of components associated with signal transmission and reception (e.g., processors, modulators, multiplexers, demodulators, demultiplexers, antennas, and so forth), as will be appreciated by one skilled in the art. Additionally, base station 102 can be a home base station, a Femto base station, and/or the like.

Base station 102 can communicate with one or more devices such as device 116; however, it is to be appreciated that base station 102 can communicate with substantially any number of devices similar to device 116. As depicted, device 116 is in communication with antennas 104 and 106, where antennas 104 and 106 transmit information to device 116 over a forward link 118 and receive information from device 116 over a reverse link 120. In a frequency division duplex (FDD) system, forward link 118 can utilize a different frequency band than that used by reverse link 120, for example. Further, in a time division duplex (TDD) system, forward link 118 and reverse link 120 can utilize a common frequency band.

In addition, devices 122 and 124 can be communicating with one another, such as in a peer-to-peer configuration. Moreover, device 122 is in communication with device 124 using links 126 and 128. In a peer-to-peer ad hoc network, devices within range of each other, such as devices 122 and 124, communicate directly with each other without a base station 102 and/or a wired infrastructure to relay their communication. Additionally, peer devices or nodes can relay traffic. The devices within the network communicating in a peer-to-peer manner can function similar to base stations and relay traffic or communications to other devices, functioning similar to base stations, until the traffic reaches its ultimate destination. The devices can also transmit control channels, which carry information that can be utilized to manage the data transmission between peer nodes.

A communication network can include any number of devices or nodes that are in wireless (or wired) communication. Each node can be within range of one or more other nodes and can communicate with the other nodes or through utilization of the other nodes, such as in a multi-hop topography (e.g., communications can hop from node to node until reaching a final destination). For example, a sender node may wish to communicate with a receiver node. To enable packet transfer between sender node and receiver node, one or more intermediate nodes can be utilized. It should be understood that any node can be a sender node and/or a receiver node and can perform functions of either sending and/or receiving information at substantially the same time (e.g., can broadcast or communicate information at about the same time as receiving information) or at different times.

System 100 can be configured to allow nodes that have initiated a communication session over a network to move the session to a direct connection. Nodes that are directly connected can exchange packets natively without any encapsulation. In accordance with some embodiments, a "homeless" node can switch to a wireless network without losing its ongoing sessions. By "homeless" it is meant a node that does not have any home agent entity to provide assistance for keeping ongoing sessions alive while switching to foreign networks nor to forward any new incoming request(s) to establish new sessions to the node's current location. In accordance with some embodiments, nodes can be mobile (e.g., wireless), static (e.g., wired), or combinations thereof (e.g., one node static and a second node mobile, both nodes mobile, and so forth).

Figure 2:
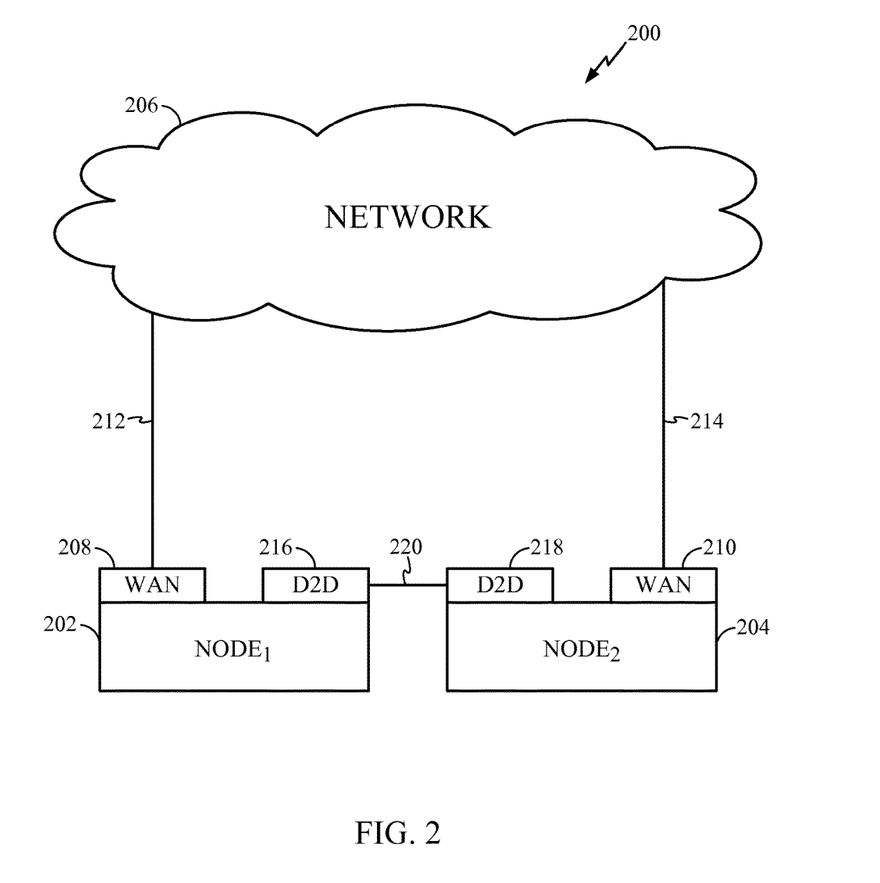
FIG. 2 illustrates a system that allows two nodes to communicate in accordance with certain embodiments of the present disclosure.

FIG. 2 illustrates a system 200 that allows two nodes to communicate over a Wide Area Network interface and/or a Device to Device interface, according to various embodiments. Included in system 200 are a first node (Node1) 202 and a second node (Node2) 204. Each node 202, 204 includes at least two interfaces. A first interface can be connected to a network 206 that provides Internet Protocol (IP) addresses. For example, the network can be a Wide Area Network (WAN), a Local Area Network (LAN), a home network, Digital Subscriber Line (DSL), cable, 3GPP based, 3GPP2 based, or any other technology providing interconnectivity and routing to a network of interest (e.g., the Internet).

Interfaces of nodes 202 and 204 can be wired (e.g., Device to Device), wireless (e.g., WAN), or combinations thereof. For example, Node1 interface can be wireless and Node2 interface can be wired, or Node2 interface can be wireless and Node1 interface can be wired, both interfaces of nodes 202 and 204 can be wireless, or both interfaces of nodes 202 and 204 can be wired.

For illustration purposes, the first interface of each node 202, 204 is a WAN interface, 208 and 210. WAN interfaces 208, 210 provide a connection over network 206, illustrated by links 212 and 214. Further, each node 202, 204 includes at least a second interface that is connected to a local network with directly connected peers or a multi-hop mesh network. For example, the local network can be a Wireless Local Area Network (WLAN) or some other type of other device to device (e.g., peer to peer) technology. For illustration purposes, the second interface of each node 202, 204 is illustrated as a Device to Device (D2D) interface 216, 218. The D2D interfaces 216, 218 allow nodes 202, 204 to perform direct communications, illustrated by direct link 220.

A procedure according to various embodiments for starting a session over network 206 and moving to a direct session (e.g., over direct link 220) will now be described. For example purposes, it is assumed that Node1 202 utilizes Mobile Internet Protocol. Communications are performed by Node1 202 utilizing its Mobile IP home address as a source address. A home address is a unicast routable address assigned to a node and is used as the permanent address of the node. Node1 202 communicates with Node2 204 over network 206 (e.g., WAN) by sending and receiving packets over respective first interfaces (e.g., WAN interfaces 208, 210). The packets can be encapsulated in a MIPv6 tunnel to a home agent, which can be included in network 206 according to various embodiments, or a route optimization tunnel directly to Node2 204.

Figure 3:
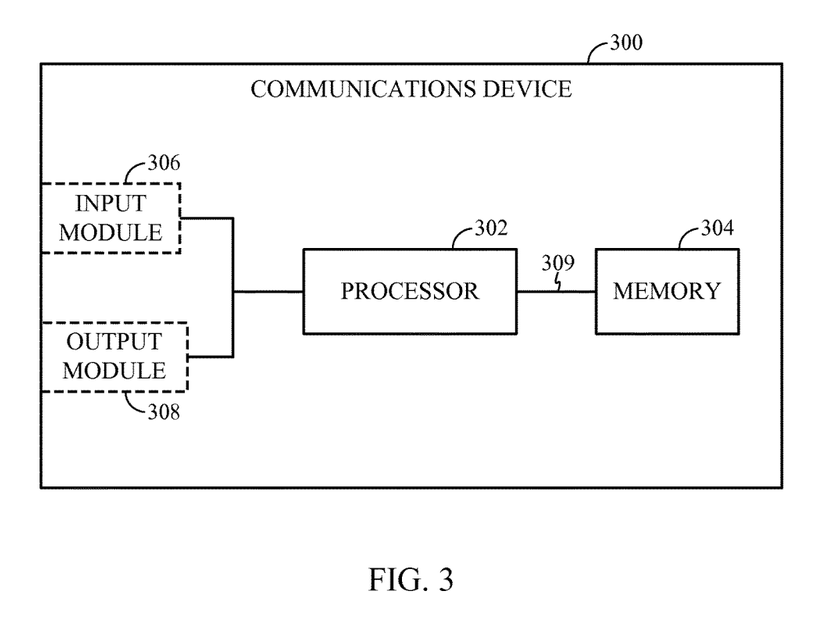
FIG. 3 illustrates an example of a communication device in accordance with certain embodiments of the present disclosure.

FIG. 3 illustrates an exemplary first communications device 300, in accordance with an exemplary embodiment. Exemplary first communications device 300 is, e.g., one of the wireless communications devices (102, 116, 122, 124) of FIG. 1 or one of the wireless communications devices (202, 204) of FIG. 2.

First communications device 300 includes a processor 302 and memory 304 coupled together via a bus 309 over which the various elements may interchange data and information. Communications device 300 further includes an input module 306 and an output module 308 which may be coupled to processor 302 as shown. However, in some embodiments, the input module 306 and output module 308 are located internal to the processor 302. Input module 306 can receive input signals. Input module 306 can, and in some embodiments does, include a wireless receiver and/or a wired or optical input interface for receiving input. Output module 308 may include, and in some embodiments does include, a wireless transmitter and/or a wired or optical output interface for transmitting output.

Processor 302 is configured to: receive a first signal from a second communications device; generate a first application alert if said first signal satisfies an application alert criteria; and receive a second signal from an access point said second signal carrying second communications device information based on a previous signal from the second communications device. The access point may be, and sometimes is, a base station. In some embodiments, the second communications device information is location information. In various embodiments, processor 302 is configured to receive said first signal via a wireless peer to peer interface as part of being configured to receive a first signal. In some embodiments, processor 302 is configured to receive the second signal via a wireless wide area network interface as part of being configured to receive the second signal.

Processor 302 is further configured to determine an operation to take based on the second communications device information included in the second signal and information included in said first signal. In one exemplary embodiment, said second communications device information included in the second signal is information on a previous location of said second communications device, said information included in the first signal is current location information, and said operation is one of a location based traffic update operation and a location based advertisement update operation. Processor 302, in some embodiments, is further configured to send an information request signal to the access point requesting information corresponding to the second communications device, in response to the generated first application alert.

Wireless nodes in a peer-to-peer (P2P) network, such as nodes 202 and 204 in the P2P network 206 may need to discover available services from one or more peer nodes in order to enable different functions beyond a pure connectivity. Services may be identified by a specific name space, numeral identifiers, and the like. Each node may maintain a list of services it is configured to provide based on chosen service identification (ID) representation in the P2P network. In one embodiment of the present disclosure, the list of services may be distributed from the serving node to its peers based on an advertisement algorithm when the serving node may send out the list based on internal triggers (e.g. based on time intervals). In another embodiment of the present disclosure, the list of services may be distributed based on a query algorithm, whereby other nodes may trigger the serving node to reply with the list of its services.

As noted above, significant gain in performance of P2P networks may be achieved if not only direct neighbors of a node can be discovered, but nodes that are multiple hops away. Thus, usage of multi-hop discovery protocols may be desirable for the P2P networks. In conventional multi-hop architectures, management of service advertisements and consumed bandwidth for discovery purposes can be significant. However, certain embodiments of the present disclosure provide a mechanism to efficiently manage a size of such service advertisements, thus reducing the discovery overhead in the P2P networks.

Exemplary Management of Services in P2P Networks

Figure 4:
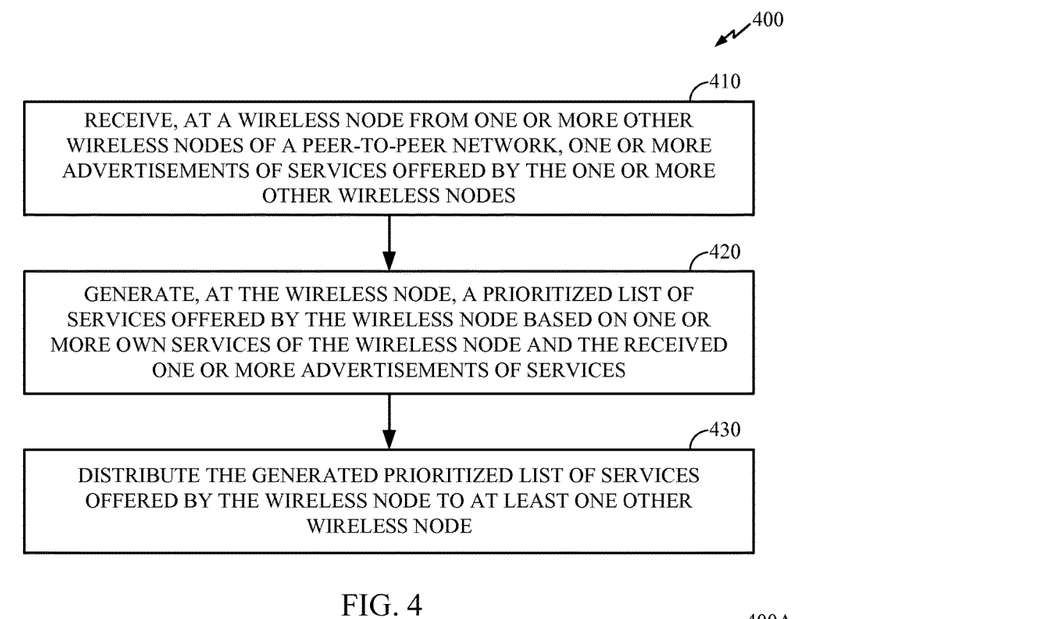
FIG. 4 illustrates example operations for managing services in a peer-to-peer network in accordance with certain embodiments of the present disclosure.

Certain embodiments of the present disclosure may help achieve efficient management of services between a plurality of wireless nodes in a peer-to-peer (P2P) network. FIG. 4 illustrates example operations 400 for efficient managing of services offered by P2P nodes, in accordance with certain embodiments of the present disclosure. The example operations 400 may be performed, for example, by a node in a multi-hop P2P network.

At 410, the node receives an advertisement of services offered by one or more other wireless nodes in the P2P network. The wireless node may, for example, receive advertisements with prioritized lists of services from other nodes in the P2P network performing these same operations.

At 420, the wireless node generates a list of services offered, based at least in part on one or more services it offers, services listed in the received advertisements of services, and possibly on an assigned priority of each service. As will be described in greater detail below, a node may add its own services to the list, but drop other services (e.g., from nodes that are farther away), which may help conserve bandwidth. By applying a priority of each service (e.g., by its order in the list), services other wireless nodes are more likely to be interested may be kept in a list and propagated on, even if a node offering those services is multiple hops away.

At 430, the generated list of services is advertised to other wireless nodes of the P2P network. Thus, prioritized lists of services may be propagated across multiple hops, providing for increased coverage to the P2P network, allowing more nodes to discover more services in which they might be interested.

Figure 5:
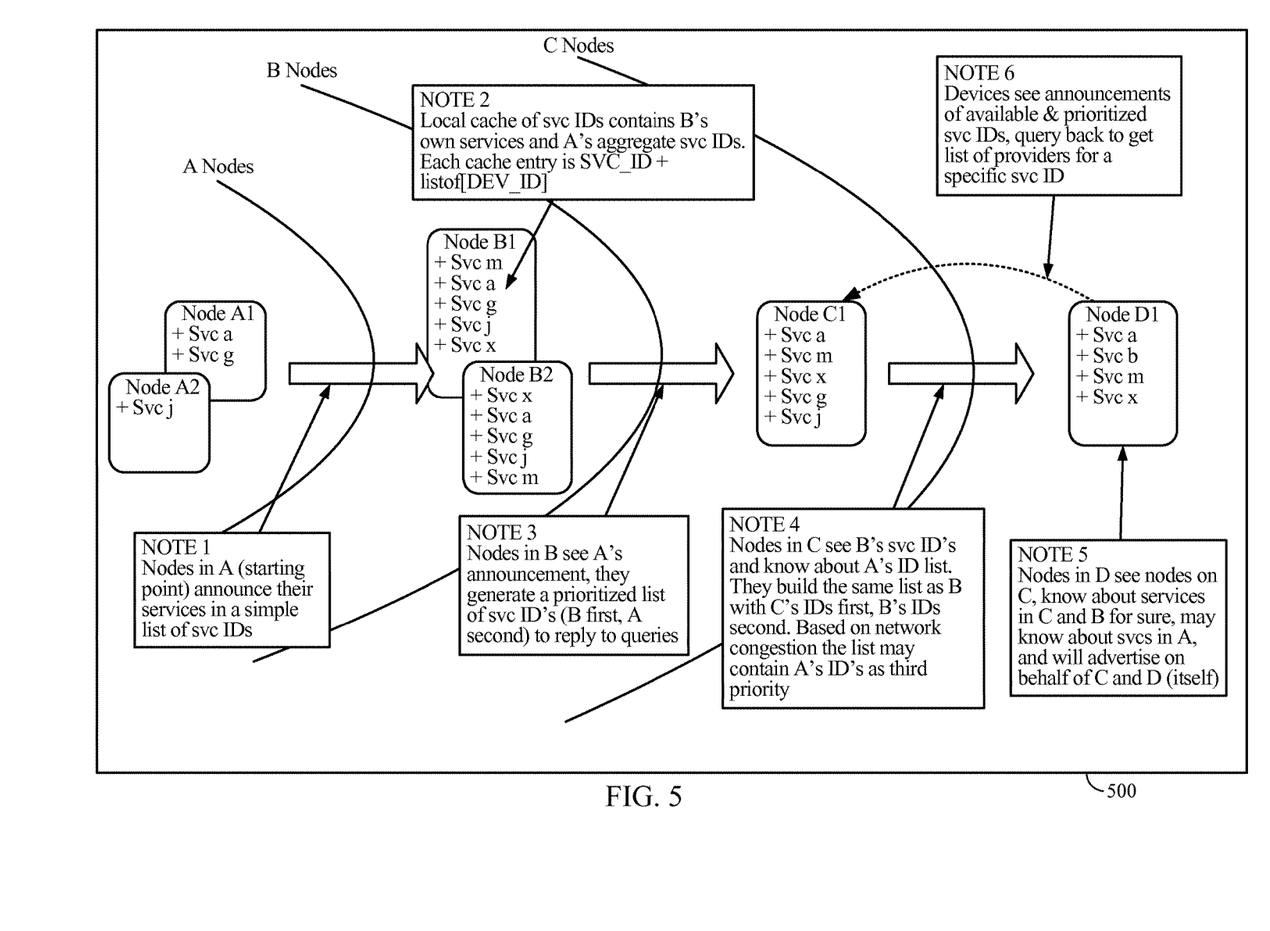
FIG. 5 illustrates a service advertisement layout in the peer-to-peer network in accordance with certain embodiments of the present disclosure.

FIG. 5 illustrates how the services in a prioritized list may change as the list is propagated across multiple hops between wireless nodes of a P2P network 500. In the illustrated example, nodes in each group A, B, and C may have direct visibility of each other. Some nodes in group B may see some nodes in group A, but nodes in group C can not see nodes in group A. A propagation path in this exemplary case is assumed to be from nodes A to nodes B to nodes C to nodes D only.

Nodes A1 and A2 illustrated in FIG. 5 may each distribute a list of services they offer: [a|g] and [j], respectively. The list of services may be represented as the list of service identifiers (IDs). Adjacent nodes B1 and B2 may see the consolidated availability of services [a|g|j] from peer nodes A1 and A2. Then, nodes B1 and B2 may concatenate their own services [m] and [x] with the list representing A1 and A2 services, and may transmit the concatenated advertisements [m|a|g|j|x] and [x|a|g|j|m], respectively.

The local cache of service IDs at a node of group B may contain group B's own services and group A's aggregate service IDs. Each cache entry may comprise a service ID and a list of node IDs that offer that particular service. It can be observed from FIG. 5 that only difference between the list of services offered by the node B1 and the list of services offered by the node B2 may be the position of services [m] and [x] in the prioritized list, as a node's own service may have a higher priority than the service of another node.

Node C1 adjacent to nodes of group B may receive the concatenated list of services of nodes A1, A2, B1, and B2. Nodes in group C may see service IDs of nodes from group B and may also know about service IDs of nodes from group A. As illustrated in FIG. 5, the node C1 may generate the same list of services as nodes of group B, but C1's own service [a] may be listed first, while services of nodes in group B may be listed after that. Depending on the network congestion, the list of services at the node C1 may also contain service IDs of nodes from group A as a third priority.

Therefore, nodes of the P2P network 500 may prioritize the service entries in their advertisement by a distance: nodes' own services may be listed first, then services that are one hop away, and so on. A distance of each service may be measured as a number of hops between a wireless node with a list of offered services comprising said service and another wireless node that initiated advertisement of the service. Furthermore, nodes may completely drop services of a specific distance from the list of offered services. In this exemplary case, services of the distance three or more may be dropped from the list. This is illustrated in FIG. 5 as the node D1 of group D drops from the list those services that are originally announced at the nodes A1 and A2 since they are three hops away from the node D1. It can be also noted that the node's own services can be also referred to services with a distance of zero.

Prioritization of offered services may be achieved by three key aspects. First, there may be a global prioritization established across all known services in order to enable quick discovery of fundamental services over value-add services, e.g. connectivity enablement over a specific application that utilizes the enabled connectivity. Such global prioritization may be typically established for all nodes by a governing entity of the P2P network. Second, each node may be configured by its associated user with a user's preferred order of announced services. Combination of global and user priorities may establish the node's own order of services. Third, service entries may be prioritized by a distance, e.g. entries with the distance zero may precede entries of neighbors (i.e. the distance equal or greater than one). Certain embodiments of the present disclosure also support combining of various priorities into a consolidated order announced by a node of the P2P network.

The present disclosure supports two key aspects for the lifetime management of service entries. First, the distance of a service entry (i.e., a location of a wireless node offering the service) may determine whether a node may drop the service from its advertisement or forward it. The distance limit may be a predetermined static value, it may vary based on the service (e.g. a service with a high global priority may have a larger distance limit), or it may vary dynamically based on a network loading and a node density. Second, nodes may be configured with a maximum advertisement size limiting an overhead of densely populated areas. The size limit may be a predetermined static limit, may be applicable only to a subset of services (e.g. services with a high global priority may be exempt), or the size limit may vary dynamically based on the network loading and node density.

Figure 6:
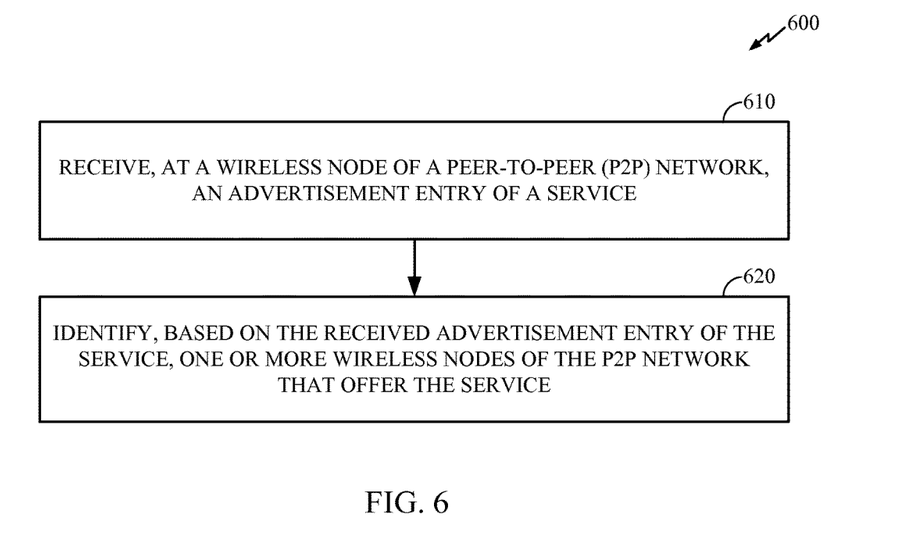
FIG. 6 illustrates example operations for identifying nodes of the peer-to-peer network that offer a particular service in accordance with certain embodiments of the present disclosure.

Certain embodiments of the present disclosure support different methods for identifying nodes that offer a particular service whose advertisement entry is available at a wireless node of the P2P network. FIG. 6 illustrates example operations 600 for identifying serving nodes in accordance with certain embodiments of the present disclosure. At 610, the advertisement entry of the service may be received at the wireless node. At 620, one or more wireless nodes of the P2P network offering the service may be identified based on a content of the received advertisement entry of the service.

The present disclosure support two methods for a wireless node to identify one or more other wireless nodes that offer a particular service of interest based on the received advertisement entry. In one embodiment, the service advertisement entry may contain the service identifier (ID) and a list of serving node IDs offering that service. Based on this information, the wireless node may associate the service ID with each serving node. In another embodiment, the service advertisement entry may contain the service ID, but no serving node IDs. In this case, the wireless node receiving such entry may be prompted to send out a "serving node query" message for this service ID in order to request serving node IDs. This is illustrated in FIG. 5 where the node D1 sends the query back to the node C1 requesting a list of providers for a specific service ID.

The policy used to form service entries may be configured at the network level, e.g. a pure advertisement discovery process may be utilized versus a pure query based where all service announcements may contain only service IDs and no serving node IDs. Furthermore, the policy by which service entries are formed may depend on different dynamic factors such as network congestion and node density, as well as a service's global priority. In this case, a mixed announcement may be formed where some service entries may include serving node IDs, while others do not.

Figure 4A:
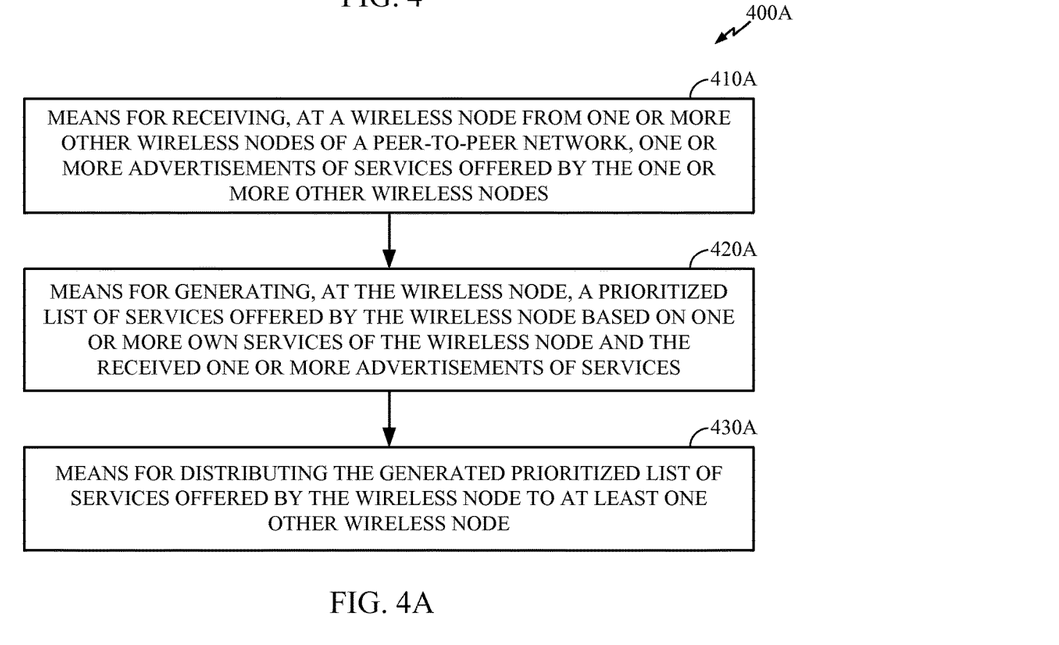
FIG. 4A illustrates example components capable of performing the operations illustrated in FIG. 4.
Figure 6A:
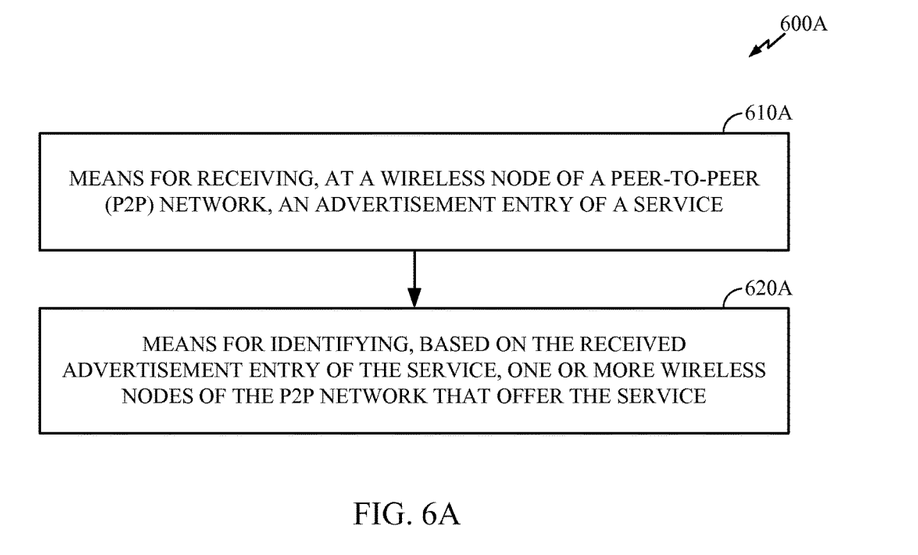
FIG. 6A illustrates example components capable of performing the operations illustrated in FIG. 6.

The various operations of methods described above may be performed by various hardware and/or software component(s) and/or module(s) corresponding to means-plus-function blocks illustrated in the Figures. For example, blocks 410-430 illustrated in FIG. 4 correspond to means-plus-function blocks 410A-430A illustrated in FIG. 4A. Similarly, blocks 610-620 illustrated in FIG. 6 correspond to means-plus-function blocks 610A-620A illustrated in FIG. 6A. More generally, where there are methods illustrated in Figures having corresponding counterpart means-plus-function Figures, the operation blocks correspond to means-plus-function blocks with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:
1. A method of wireless communication, comprising:
receiving, at a first communication device, a first signal from a second communication device over a peer-to-peer connection between the first communication device and the second communication device;

receiving, at the first communication device, a second signal from an access point of a cellular network; and performing a location-based operation at the first communication device with respect to the second communication device based at least in part on previous location information for the second communication device and current location information for the second communication device included in the first and second signals, wherein the location-based operation includes:

moving a session between the first communication device and the second communication device implemented over the peer-to-peer connection to a connection between the first communication device and the second communication device implemented over the cellular network; or moving a session between the first communication device and the second communication device implemented over the cellular network to the peer-to-peer connection between the first communication device and the second communication device.

2. The method of claim 1, further comprising:
updating an advertisement of services offered by the first communication device.

3. The method of claim 2, further comprising:
detecting an internal trigger at the first device; and
distributing the advertised services based on the detected internal trigger.

4. The method of claim 3, wherein the internal trigger comprises a time-based trigger.

5. The method of claim 3, wherein detecting the internal trigger comprises:
receiving a query from at least one communication device other than the second communication device.

6. The method of claim 3, wherein detecting the internal trigger comprises:
determining that the first communication device has changed location.

7. The method of claim 1, wherein the peer-to-peer connection between the first communication device and the second communication device comprises a direct device-to-device connection.

8. The method of claim 1, wherein the peer-to-peer connection between the first communication device and the second communication device comprises a multi-hop mesh network.

9. The method of claim 1, wherein at least one of the communication devices comprises a wireless device.

10. The method of claim 1, wherein the network access point comprises a base station.

11. An apparatus for wireless communication, comprising:
means for receiving, at a first communication device, a first signal from a second communication device over a peer-to-peer connection between the first communication device and the second communication device;
means for receiving, at the first communication device, a second signal from an access point of a cellular network; and
means for a location-based operation at the first communication device with respect to the second communication device based at least in part on previous location information for the second communication device and current location information for the second communication device included in the first and second signals, wherein the means for the location-based operation includes:

means for moving a session between the first communication device and the second communication device implemented over the peer-to-peer connection to a connection between the first communication device and the second communication device implemented over the cellular network; or means for moving a session between the first communication device and the second communication device implemented over the cellular network to the peer-to-peer connection between the first communication device and the second communication device.

12. The apparatus of claim 11, further comprising:
means for updating an advertisement of services offered by the first communication device.

13. The apparatus of claim 12, further comprising:
means for detecting an internal trigger at the first device; and
means for distributing the advertised services based on the detected internal trigger.

14. The apparatus of claim 13, wherein the internal trigger comprises a time-based trigger.

15. The apparatus of claim 13, wherein the means for detecting the internal trigger comprises:
means for receiving a query from at least one communication device other than the second communication device.

16. The apparatus of claim 13, wherein the means for detecting the internal trigger comprises:
means for determining that the first communication device has changed location.

17. The apparatus of claim 11, wherein the peer-to-peer connection between the first communication device and the second communication device comprises a direct device-to-device connection.

18. The apparatus of claim 11, wherein the peer-to-peer connection between the first communication device and the second communication device comprises a multi-hop mesh network.

19. The apparatus of claim 11, wherein at least one of the communication devices comprises a wireless device.

20. The apparatus of claim 11, wherein the network access point comprises a base station.

21. An apparatus for wireless communication, comprising:
at least one processor; and
a memory in electronic communication with the processor, the memory embodying instructions, the instructions being executable by the processor to:
receive, at a first communication device, a first signal from a second communication device over a peer-to-peer connection between the first communication device and the second communication device;
receive, at the first communication device, a second signal from an access point of a cellular network; and
perform a location-based operation at the first communication device with respect to the second communication device based at least in part on previous location information for the second communication device and current location information for the second communication device included in the first and second signals, wherein the location-based operation includes:
moving a session between the first communication device and the second communication device implemented over the peer-to-peer connection to a connection between the first communication device and the second communication device implemented over the cellular network; or moving a session between the first communication device and the second communication device implemented over the cellular network to the peer-to-peer connection between the first communication device and the second communication device.

22. The apparatus of claim 21, wherein the instructions are further executable by the at least one processor to update an advertisement of services offered by the first communication device.

23. The apparatus of claim 22, wherein the instructions are further executable by the at least one processor to:
detect an internal trigger at the first device; and
distribute the advertised services based on the detected internal trigger.

24. The apparatus of claim 23, wherein the internal trigger comprises a time-based trigger.

25. The apparatus of claim 23, wherein detecting the internal trigger comprises:
receiving a query from at least one communication device other than the second communication device.

26. The apparatus of claim 23, wherein detecting the internal trigger comprises:
determining that the first communication device has changed location.

27. The apparatus of claim 21, wherein the peer-to-peer connection between the first communication device and the second communication device comprises a direct device-to-device connection.

28. The apparatus of claim 21, wherein the peer-to-peer connection between the first communication device and the second communication device comprises a multi-hop mesh network.

29. The apparatus of claim 21, wherein at least one of the communication devices comprises a wireless device.

30. The apparatus of claim 21, wherein the network access point comprises a base station.

31. A non-transitory computer-readable medium comprising instructions, which when executed by a processor, causes the processor to:
receive, at a first communication device, a first signal from a second communication device over a peer-to-peer connection between the first communication device and the second communication device;
receive, at the first communication device, a second signal from an access point of a cellular network; and
perform a location-based operation at the first communication device with respect to the second communication device based at least in part on previous location information for the second communication device and current location information for the second communication device included in the first and second signals, wherein the location-based operation includes:
moving a session between the first communication device and the second communication device implemented over the peer-to-peer connection to a connection between the first communication device and the second communication device implemented over the cellular network; or
moving a session between the first communication device and the second communication device implemented over the cellular network to the peer-to-peer connection between the first communication device and the second communication device.

\* \* \* \* \*